United States Patent
Lindhé et al.

(10) Patent No.: US 10,149,589 B2
(45) Date of Patent: Dec. 11, 2018

(54) SENSING CLIMB OF OBSTACLE OF A ROBOTIC CLEANING DEVICE

(71) Applicant: Aktiebolaget Electrolux, Stockholm (SE)

(72) Inventors: Magnus Lindhé, Stockholm (SE); Petter Forsberg, Stockholm (SE)

(73) Assignee: Aktiebolaget Electrolux (SE)

( * ) Notice: Subject to any disclaimer, the term of this patent is extended or adjusted under 35 U.S.C. 154(b) by 223 days.

(21) Appl. No.: 15/101,515

(22) PCT Filed: Dec. 19, 2013

(86) PCT No.: PCT/EP2013/077387
§ 371 (c)(1),
(2) Date: Jun. 3, 2016

(87) PCT Pub. No.: WO2015/090405
PCT Pub. Date: Jun. 25, 2015

(65) Prior Publication Data
US 2016/0353959 A1 Dec. 8, 2016

(51) Int. Cl.
*A47L 11/40* (2006.01)
*A47L 9/28* (2006.01)
(Continued)

(52) U.S. Cl.
CPC ......... *A47L 11/4011* (2013.01); *A47L 9/2826* (2013.01); *A47L 11/24* (2013.01);
(Continued)

(58) Field of Classification Search
None
See application file for complete search history.

(56) References Cited

U.S. PATENT DOCUMENTS 1,286,321 A 12/1918 Hoover
1,401,007 A 12/1921 Staples
(Continued)

FOREIGN PATENT DOCUMENTS

CA 2154758 6/1995
CN 1116818 2/1996
(Continued)

OTHER PUBLICATIONS

International Search Report and Written Opinion for International Application No. PCT/EP2015/070140, dated May 27, 2016, 11 pages.
(Continued)

*Primary Examiner* — Eric W Golightly
(74) *Attorney, Agent, or Firm* — RatnerPrestia

(57) ABSTRACT

A robotic cleaning device having a main body and a propulsion system to move the robotic cleaning device, an obstacle detecting device, a controller to control the propulsion system to move the robotic cleaning device, and an angle-measuring device to measure tilt angles of the robotic cleaning device. The controller controls the angle-measuring device to measure a first tilt angle of the robotic cleaning device before the obstacle is traversed, and to measure a second tilt angle of the robotic cleaning device while the robotic cleaning device traverses the obstacle. The controller compares the second tilt angle with the first tilt angle, and controls the operation of the robotic cleaning device based on a difference between the second tilt angle and the first tilt angle.

20 Claims, 7 Drawing Sheets

(51) Int. Cl.
*G05D 1/02* (2006.01)
*A47L 11/24* (2006.01)

(52) U.S. Cl.
CPC ....... *A47L 11/4013* (2013.01); *A47L 11/4041* (2013.01); *G05D 1/027* (2013.01); *G05D 1/0214* (2013.01); *G05D 1/0248* (2013.01); *A47L 2201/04* (2013.01); *A47L 2201/06* (2013.01); *G05D 2201/0215* (2013.01)

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts et al. |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist et al. |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |

(56) References Cited

U.S. PATENT DOCUMENTS

| | | |
|---|---|---|
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer et al. |
| 7,053,578 B2 | 5/2006 | Diehl et al. |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |

(56) References Cited

U.S. PATENT DOCUMENTS

| | | | |
|---|---|---|---|
| 7,430,455 | B2 | 9/2008 | Casey |
| 7,438,766 | B2 | 10/2008 | Song |
| 7,441,298 | B2 | 10/2008 | Svendsen |
| 7,444,206 | B2 | 10/2008 | Abramson |
| 7,448,113 | B2 | 11/2008 | Jones |
| 7,459,871 | B2 | 12/2008 | Landry |
| 7,464,157 | B2 | 12/2008 | Okude |
| 7,474,941 | B2 | 1/2009 | Kim |
| 7,480,958 | B2 | 1/2009 | Song |
| 7,480,960 | B2 | 1/2009 | Kim |
| D586,959 | S | 2/2009 | Geringer |
| 7,489,277 | B2 | 2/2009 | Sung |
| 7,489,985 | B2 | 2/2009 | Ko |
| 7,499,774 | B2 | 3/2009 | Barrett |
| 7,499,775 | B2 | 3/2009 | Filippov |
| 7,499,776 | B2 | 3/2009 | Allard |
| 7,499,804 | B2 | 3/2009 | Svendsen |
| 7,503,096 | B2 | 3/2009 | Lin |
| 7,515,991 | B2 | 4/2009 | Egawa |
| D593,265 | S | 5/2009 | Carr |
| 7,539,557 | B2 | 5/2009 | Yamauchi |
| 7,546,891 | B2 | 6/2009 | Won |
| 7,546,912 | B1 | 6/2009 | Pack |
| 7,555,363 | B2 | 6/2009 | Augenbraun |
| 7,556,108 | B2 | 7/2009 | Won |
| 7,559,269 | B2 | 7/2009 | Rudakevych |
| 7,564,571 | B2 | 7/2009 | Karabassi |
| 7,566,839 | B2 | 7/2009 | Hukuba |
| 7,567,052 | B2 | 7/2009 | Jones |
| 7,568,259 | B2 | 8/2009 | Yan |
| 7,568,536 | B2 | 8/2009 | Yu |
| 7,571,511 | B2 | 8/2009 | Jones |
| 7,573,403 | B2 | 8/2009 | Goncalves |
| 7,574,282 | B2 | 8/2009 | Petersson |
| 7,578,020 | B2 | 8/2009 | Jaworski |
| 7,579,803 | B2 | 8/2009 | Jones |
| 7,581,282 | B2 | 9/2009 | Woo |
| 7,597,162 | B2 | 10/2009 | Won |
| 7,600,521 | B2 | 10/2009 | Woo |
| 7,600,593 | B2 | 10/2009 | Filippov |
| 7,603,744 | B2 | 10/2009 | Reindle |
| 7,604,675 | B2 | 10/2009 | Makarov |
| 7,610,651 | B2 | 11/2009 | Baek |
| 7,613,543 | B2 | 11/2009 | Petersson |
| 7,620,476 | B2 | 11/2009 | Morse |
| 7,636,982 | B2 | 12/2009 | Jones |
| 7,647,144 | B2 | 1/2010 | Haegermarck |
| 7,650,666 | B2 | 1/2010 | Jang |
| 7,654,348 | B2 | 2/2010 | Ohm |
| 7,660,650 | B2 | 2/2010 | Kawagoe |
| 7,663,333 | B2 | 2/2010 | Jones |
| 7,673,367 | B2 | 3/2010 | Kim |
| 7,679,532 | B2 | 3/2010 | Karlsson |
| 7,688,676 | B2 | 3/2010 | Chiappetta |
| 7,693,654 | B1 | 4/2010 | Dietsch |
| 7,697,141 | B2 | 4/2010 | Jones |
| 7,706,917 | B1 | 4/2010 | Chiappetta |
| 7,706,921 | B2 | 4/2010 | Jung |
| 7,709,497 | B2 | 5/2010 | Christensen, IV |
| 7,711,450 | B2 | 5/2010 | Im |
| 7,720,572 | B2 | 5/2010 | Ziegler |
| 7,721,829 | B2 | 5/2010 | Lee |
| 7,729,801 | B2 | 6/2010 | Abramson |
| 7,749,294 | B2 | 7/2010 | Oh |
| 7,751,940 | B2 | 7/2010 | Lee |
| 7,761,954 | B2 | 7/2010 | Ziegler |
| 7,765,635 | B2 | 8/2010 | Park |
| 7,765,638 | B2 | 8/2010 | Pineschi et al. |
| 7,769,490 | B2 | 8/2010 | Abramson |
| 7,774,158 | B2 | 8/2010 | Domingues Goncalves |
| 7,779,504 | B2 | 8/2010 | Lee |
| 7,780,796 | B2 | 8/2010 | Shim |
| 7,784,139 | B2 | 8/2010 | Sawalski |
| 7,784,570 | B2 | 8/2010 | Couture |
| 7,785,544 | B2 | 8/2010 | Alward |
| 7,787,991 | B2 | 8/2010 | Jeung |
| 7,793,614 | B2 | 9/2010 | Ericsson |
| 7,801,645 | B2 | 9/2010 | Taylor |
| 7,805,220 | B2 | 9/2010 | Taylor |
| 7,827,653 | B1 | 11/2010 | Liu |
| 7,832,048 | B2 | 11/2010 | Harwig |
| 7,835,529 | B2 | 11/2010 | Hernandez |
| 7,843,431 | B2 | 11/2010 | Robbins |
| 7,844,364 | B2 | 11/2010 | McLurkin |
| 7,849,555 | B2 | 12/2010 | Hahm |
| 7,856,291 | B2 | 12/2010 | Jung |
| 7,860,608 | B2 | 12/2010 | Lee |
| 7,861,365 | B2 | 1/2011 | Sun |
| 7,861,366 | B2 | 1/2011 | Hahm |
| 7,873,437 | B2 | 1/2011 | Aldred |
| 7,877,166 | B2 | 1/2011 | Harwig |
| 7,886,399 | B2 | 2/2011 | Dayton |
| 7,890,210 | B2 | 2/2011 | Choi |
| 7,891,045 | B2 | 2/2011 | Kim |
| 7,891,289 | B2 | 2/2011 | Day |
| 7,891,446 | B2 | 2/2011 | Couture |
| 7,894,951 | B2 | 2/2011 | Norris |
| 7,916,931 | B2 | 3/2011 | Lee |
| 7,920,941 | B2 | 4/2011 | Park |
| 7,921,506 | B2 | 4/2011 | Baek |
| 7,926,598 | B2 | 4/2011 | Rudakevych |
| 7,934,571 | B2 | 5/2011 | Chiu |
| 7,937,800 | B2 | 5/2011 | Yan |
| 7,942,107 | B2 | 5/2011 | Vosburgh |
| 7,957,837 | B2 | 6/2011 | Ziegler |
| 7,962,997 | B2 | 6/2011 | Chung |
| 7,966,339 | B2 | 6/2011 | Kim |
| 7,975,790 | B2 | 7/2011 | Kim |
| 7,979,175 | B2 | 7/2011 | Allard |
| 7,979,945 | B2 | 7/2011 | Dayton |
| 7,981,455 | B2 | 7/2011 | Sus |
| 7,997,118 | B2 | 8/2011 | Mecca |
| 8,001,651 | B2 | 8/2011 | Chang |
| 8,007,221 | B1 | 8/2011 | More |
| 8,010,229 | B2 | 8/2011 | Kim |
| 8,019,223 | B2 | 9/2011 | Hudson |
| 8,020,657 | B2 | 9/2011 | Allard |
| 8,032,978 | B2 | 10/2011 | Haegermarck |
| 8,034,390 | B2 | 10/2011 | Sus |
| 8,042,663 | B1 | 10/2011 | Pack |
| 8,046,103 | B2 | 10/2011 | Abramson |
| 8,061,461 | B2 | 11/2011 | Couture |
| 8,065,778 | B2 | 11/2011 | Kim |
| 8,073,439 | B2 | 12/2011 | Stromberg |
| 8,074,752 | B2 | 12/2011 | Rudakevych |
| 8,078,338 | B2 | 12/2011 | Pack |
| 8,079,432 | B2 | 12/2011 | Ohm |
| 8,082,836 | B2 | 12/2011 | More |
| 8,086,419 | B2 | 12/2011 | Goncalves |
| 8,087,117 | B2 | 1/2012 | Kapoor |
| 8,095,238 | B2 | 1/2012 | Jones |
| 8,095,336 | B2 | 1/2012 | Goncalves |
| 8,107,318 | B2 | 1/2012 | Chiappetta |
| 8,108,092 | B2 | 1/2012 | Phillips |
| 8,109,191 | B1 | 2/2012 | Rudakevych |
| 8,112,942 | B2 | 2/2012 | Bohm |
| 8,113,304 | B2 | 2/2012 | Won |
| 8,122,982 | B2 | 2/2012 | Morey |
| 8,127,396 | B2 | 3/2012 | Mangiardi |
| 8,127,399 | B2 | 3/2012 | Dilger |
| 8,127,704 | B2 | 3/2012 | Vosburgh |
| 8,136,200 | B2 | 3/2012 | Splinter |
| 8,150,650 | B2 | 4/2012 | Goncalves |
| D659,311 | S | 5/2012 | Geringer |
| 8,166,904 | B2 | 5/2012 | Israel |
| 8,195,333 | B2 | 6/2012 | Ziegler |
| 8,196,251 | B2 | 6/2012 | Lynch |
| 8,199,109 | B2 | 6/2012 | Robbins |
| 8,200,600 | B2 | 6/2012 | Rosenstein |
| 8,200,700 | B2 | 6/2012 | Moore |
| 8,237,389 | B2 | 8/2012 | Fitch |
| 8,237,920 | B2 | 8/2012 | Jones |
| 8,239,992 | B2 | 8/2012 | Schnittman |
| 8,244,469 | B2 | 8/2012 | Cheung |

(56) References Cited

U.S. PATENT DOCUMENTS

| | | |
|---|---|---|
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | DiBernado |
| 10,045,675 B2 | 8/2018 | Haegermarck |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |

(56) References Cited

U.S. PATENT DOCUMENTS

| | | |
|---|---|---|
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun et al. |
| 2007/0114975 A1 | 5/2007 | Cohen |
| 2007/0118248 A1 | 5/2007 | Lee et al. |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer et al. |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein et al. |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto et al. |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |

(56) References Cited

U.S. PATENT DOCUMENTS

| | | |
|---|---|---|
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann et al. |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon et al. |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |

(56) References Cited

U.S. PATENT DOCUMENTS

| | | |
|---|---|---|
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung et al. |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh et al. |
| 2013/0340201 A1 | 12/2013 | Jang et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim et al. |
| 2015/0039127 A1 | 2/2015 | Matsumoto |
| 2015/0057800 A1 | 2/2015 | Cohen |
| 2015/0197012 A1 | 7/2015 | Schnittman |
| 2015/0206015 A1 | 7/2015 | Ramalingam et al. |
| 2015/0265122 A1 | 9/2015 | Han et al. |
| 2016/0306359 A1 | 10/2016 | Lindhe |
| 2016/0316982 A1 | 11/2016 | Kim et al. |
| 2017/0273521 A1 | 9/2017 | Klintemyr et al. |
| 2017/0273524 A1 | 9/2017 | Klintemyr et al. |
| 2018/0103812 A1 | 4/2018 | Lee et al. |

FOREIGN PATENT DOCUMENTS

| | | |
|---|---|---|
| CN | 1668238 A | 9/2005 |
| CN | 101161174 A | 4/2008 |
| CN | 101297267 A | 10/2008 |
| CN | 102083352 A | 6/2011 |
| CN | 103027634 | 4/2013 |
| CN | 103054516 A | 4/2013 |
| CN | 103491838 A | 1/2014 |
| CN | 103565373 A | 2/2014 |
| DE | 3536907 | 4/1986 |
| DE | 9307500 | 7/1993 |
| DE | 4211789 | 10/1993 |
| DE | 4340367 | 6/1995 |
| DE | 4439427 A1 | 5/1996 |
| DE | 19849978 | 5/2000 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 A2 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 A2 | 6/2012 |
| EP | 2561787 | 2/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2772815 | 9/2014 |
| EP | 2884364 A1 | 6/2015 |
| FR | 2999410 | 6/2014 |
| GB | 2355523 | 4/2001 |
| GB | 2382251 | 5/2003 |
| GB | 2494446 | 3/2013 |
| GB | 1447943 | 10/2013 |
| JP | 5540959 | 3/1980 |
| JP | 6286414 | 4/1987 |
| JP | 62109528 | 5/1987 |
| JP | 62120510 | 6/1987 |
| JP | 63127310 A | 5/1988 |
| JP | 63181727 | 7/1988 |
| JP | 63241610 | 10/1988 |
| JP | 03162814 A | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 A | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 B2 | 4/1995 |
| JP | 07129239 A | 5/1995 |
| JP | 07281742 | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002355204 | 12/2002 |
| JP | 2002366228 | 12/2002 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 A | 2/2005 |
| JP | 2005124753 A | 5/2005 |
| JP | 2005141636 A | 6/2005 |
| JP | 2005314116 A | 11/2005 |

(56) References Cited

FOREIGN PATENT DOCUMENTS

| | | | |
|---|---|---|---|
| JP | 200605113 A | 1/2006 | |
| JP | 2006087507 | 4/2006 | |
| JP | 2006185438 A | 7/2006 | |
| JP | 2006231477 | 9/2006 | |
| JP | 2006314669 | 11/2006 | |
| JP | 2007014369 A | 1/2007 | |
| JP | 2007070658 | 3/2007 | |
| JP | 2007143645 A | 6/2007 | |
| JP | 2007213236 A | 8/2007 | |
| JP | 2007226322 A | 9/2007 | |
| JP | 2007272665 A | 10/2007 | |
| JP | 2008132299 A | 6/2008 | |
| JP | 2008146617 A | 6/2008 | |
| JP | 2008290184 | 12/2008 | |
| JP | 2008543394 A | 12/2008 | |
| JP | 2009509220 | 3/2009 | |
| JP | 2009193240 A | 8/2009 | |
| JP | 2010507169 A | 3/2010 | |
| JP | 2010079869 A | 4/2010 | |
| JP | 2010526594 | 8/2010 | |
| JP | 2010534825 A | 11/2010 | |
| JP | 2011045694 | 3/2011 | |
| JP | 2011253361 A | 12/2011 | |
| JP | 2012216051 A | 11/2012 | |
| JP | 2013041506 A | 2/2013 | |
| JP | 2013089256 A | 5/2013 | |
| JP | 2014023930 A | 2/2014 | |
| KR | 20050003112 | 1/2005 | |
| KR | 20090028359 | 3/2009 | |
| KR | 101231932 | 3/2013 | |
| WO | 8804081 | 6/1988 | |
| WO | 9303399 | 2/1993 | |
| WO | 9638770 | 12/1996 | |
| WO | 0036961 | 6/2000 | |
| WO | 0036970 | 6/2000 | |
| WO | 0038025 | 6/2000 | |
| WO | 0182766 A2 | 11/2001 | |
| WO | 03022120 | 3/2003 | |
| WO | 03024292 | 3/2003 | |
| WO | 03026474 A2 | 4/2003 | |
| WO | 2004006034 A2 | 1/2004 | |
| WO | 2004082899 | 9/2004 | |
| WO | 2007008148 | 1/2007 | |
| WO | 2007028049 | 3/2007 | |
| WO | 2007051972 | 5/2007 | |
| WO | 2007065034 | 6/2007 | |
| WO | 2008048260 | 4/2008 | |
| WO | 2009132317 | 10/2009 | |
| WO | 2013105431 | 7/2013 | |
| WO | 2013157324 | 10/2013 | |
| WO | 2014033055 | 3/2014 | |
| WO | 2015016580 | 2/2015 | |

OTHER PUBLICATIONS

European Communication Pursuant to Article 94(3) for European Application No. 13817911.4, dated Jan. 15, 2018, 8 pages.
Non Final Office Action for U.S. Appl. No. 15/102,017, dated Feb. 16, 2018, 12 pages.
Non Final Office Action for U.S. Appl. No. 15/101,212, dated May 17, 2017, 8 pages.
Japanese Office Action forApplication for Japanese Application No. 2015-528969, dated Apr. 7, 2017 with translation, 4 pages.
Final Office Action for U.S. Appl. No. 14/409,291, dated Jun. 6, 2017, 21 pages.
Chinese Office Action for Chinese Application No. 201380075503.9, dated Nov. 8, 2017 with translation, 16 pages.
European Communication Pursuant to Article 94(3) for European Application No. 16176479.0, dated Nov. 27, 2017, 6 pages.
Notice of Allowance for U.S. Appl. No. 14/409,291, dated Sep. 18, 2017, 8 pages.
Notice of Reasons for Rejection for Japanese Application No. 2016-526764, dated Aug. 25, 2017 with translation, 6 paes.
Notification of Reasons for Rejection for Japanese Application No, 2016-526765, dated Aug. 25, 2017 with translation, 7 pages.
Notifcation of Reasons for Refusal for Japanese Application No, 2016-526756, dated Aug. 10, 2017 with translation, 6 pages.
Notification of Reasons for Refusal for Japanese Application No. 2016-526759, dated Aug. 24, 2017 with translation, 9 pages.
Notice of Allowance for U.S. Appl. No. 15/101,257, dated Jul. 6, 2017, 9 pages.
International Search Report and Written Opinion of the International Searching Authority for International Application No. PCT/EP2015/058377, dated Aug. 10, 2016, 15 pages.
Non Final Office Action for U.S. Appl. No. 15/102,015, dated Aug. 17, 2017, 13 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notification of Reasons for Rejection for Japanese Application No. 2016-526947, dated Sep. 21, 2017 with translation, 8 pages.
Notice of Allowance for U.S. Appl. No. 15/102,015, dated Dec. 11, 2017, 8 pages.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Chinese Office Action for Chinese Application No. 20130075510.9, dated Feb. 6, 2017 with translation, 14pages.
Chinese Office Action for Chinese Application No. 201380075503.9, dated Feb. 13, 2017 with translation, 18 pages.
Chung etal.,"Path Planning for a Mobile Robot With Grid Type World Model", Proceedings of the 1992 IEEE/RSJ International Conference on Intelligent Robots and Systems, Jul. 7-10, 1992, pp. 439-444.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.
Everett, Sensors for Mobile Robots Theory and Application, A.K. Peters, 1995, Chapters 1 and 3, 70pages.
Everett, Sensors for Mobile Robots Theory and Application, A.K. Peters, Ltd., 1995, Chapters 15 and 16, 59pages.
Everett, Sensors for Mobile Robots Theory and Application, A.K. Peters, Ltd., 1995, Chapters 6, 7 and 10, 79pages.
Everett, Sensors for Mobile Robots Theory and Application, A.K. Peters, Ltd., 1995, Chapters, 4a nd 5, 68pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9pages.
Final Office Action for U.S. Appl. No. 15/100,667, dated Apr. 21, 2017, 26 pages.
Gavrilut, et al., "Wall-Following Method for an Autonomous Mobile Robot using Two IR Sensors", 12th WSEAS International Conference on SYSTEMS, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.

(56) References Cited

OTHER PUBLICATIONS

International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority fo rInternatonal Applicaion No. PCT/EP2014/0077142, dated Sep. 11, 2015, 8 pages.
International Search Report and Written Opinion of the International Searching Authority for International Application No. PCT/EP2014/069073, dated May 12, 2015, 10pages.
International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2014, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 11 pages.
International Search Report and Written Opinion of the International Searching Authority for International Application No. PCT/EP2014/078144, 7 pages, dated Apr. 15, 2015.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 dated Apr. 2, 2014, 4 pages.
International Search Report for International Application No. PCT/EP2013/067500 dated Dec. 10, 2013, 4pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90, 1993.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref,etal."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61pages.
Non Final Office Action for U.S. Appl. No. 15/100,667, dated Sep. 12, 2016, 24 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Notice of Allowance for U.S. Appl. No. 14/409,291, dated Jun. 16, 2016, 13 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, Technical Report TR/IRIDIA/ 95 25, Cover page + pp. 1-14.
Written Opinion for International Application No. PCT/EP2013/067500 dated Dec. 10, 2013, 7pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11, 1993.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.

(56) References Cited

OTHER PUBLICATIONS

Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
Notice of Allowance for U.S. Appl. No. 15/101,212, dated Apr. 11, 2018, 9 pages.
Final Office Action for U.S. Appl. No. 14/784,106, dated Mar. 28, 2018, 8 pages.
22 Final Office Action for U.S. Appl. No. 15/100,667, dated Mar. 27, 2018, 22 pages.
Final Office Action for U.S. Appl. No. 15/102,107, dated Jun. 14, 2018, 12 pages.
Non Final Office Action for U.S. Appl. No. 15/101,235, dated Jun. 14, 2018, 11 pages.
Notice of Allowance for U.S. Appl. No. 15/102,295, dated Sep. 24, 2018, 9 pages.
Notice of Allowance for U.S. Appl. No. 14/784,106, dated Oct. 11, 2018, 7 pages.
Non Final Office Action for U.S. Appl. No. 15/321,333, dated Oct. 24, 2018, 10 pages.
Position_Definition of Position by Merriam-Webster.pdf (Position | Definition of Position by Merriam-W3ebster, Oct. 16, 2018, Merriam-Webster, https://www.merriam-webster.com/dictionary/position, pp. 1-15.
Gutman et al., AMOS: Comparison of Scan Matching Approaches for Self-Localization in Indoor Environments, 1996, IEEE, pp. 61-67.
Non Final Office Action for U.S. Appl. No. 15/504,071, dated Nov. 2, 2018, 17 pages.
Non Final Office Action for U.S. Appl. No. 15/504,066, dated Nov. 5, 2018, 18 pages.
Notification of Reasons for Refusal of Japanese Application No. 2016-568949, dated Oct. 1, 2018 with translation, 6 pages.

SENSING CLIMB OF OBSTACLE OF A ROBOTIC CLEANING DEVICE

TECHNICAL FIELD

The invention relates to a method of controlling operation of a robotic cleaning device and a robotic cleaning device performing the method.

BACKGROUND

In many fields of technology, it is desirable to use robots with an autonomous behaviour such that they freely can move around a space without colliding with possible obstacles.

Robotic vacuum cleaners are know in the art, which are equipped with drive means in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a space in the form of e.g. a room. Thus, these prior art robotic vacuum cleaners has the capability of more or less autonomously vacuum cleaning a room in which furniture such as tables and chairs and other obstacles such as walls and stairs are located. Traditionally, these robotic vacuum cleaners have navigated a room by means of using e.g. ultrasound or light waves. Further, the robotic vacuum cleaners typically must be complemented with additional sensors, such as stair sensors, wall-tracking sensors and various transponders to perform accurately.

A large number of prior art robot vacuum cleaners use a technology referred to as Simultaneous Localization and Mapping (SLAM). SLAM is concerned with the problem of building a map of an unknown environment by a mobile robot while at the same time navigating the environment using the map. This is typically combined with a horizontally scanning laser for range measurement. Further, odometry is used to provide an approximate position of the robot as measured by the movement of the wheels of the robot.

US 2002/0091466 discloses a mobile robot with a first camera directed toward the ceiling of a room for recognizing a base mark on the ceiling and a line laser for emitting a linear light beam toward an obstacle, a second camera for recognizing a reflective linear light beam from the obstacle. The line laser emits a beam in the form of straight line extending horizontally in front of the mobile robot.

Further methods known in the art comprise horizontal laser scanning of an area to be represented in 3D, in combination with a camera recording images the area. Features can thus be extracted from the recorded images in order to create the 3D representation.

The process of causing robotic cleaning devices to behave in an autonomous manner is highly complex, even when the robotic cleaning device navigates over a plane surface, and becomes even more complex when the robotic cleaning device is to consider objects and further transverse these objects such as for instance doorsteps.

SUMMARY

An object of the present invention is to provide an improved method of operating a robotic cleaning device and a robotic cleaning device performing the improved method.

This object is attained in a first aspect of the present invention by a method of controlling operation of a robotic cleaning device. The method comprises detecting an obstacle to be traversed by the robotic cleaning device and measuring a first tilt angle of the robotic cleaning device before the obstacle is traversed. Thereafter, a second tilt angle of the robotic cleaning device is measured while the robotic cleaning device traverses the obstacle and the second tilt angle is compared with the first tilt angle. Finally, the operation of the robotic cleaning device is controlled based on a difference between the second tilt angle and the first tilt angle.

This object is attained in a second aspect of the present invention by a robotic cleaning device comprising a main body, a propulsion system arranged to move the robotic cleaning device. The robotic cleaning device further comprises an obstacle detecting device, a controller arranged to control the propulsion system to move the robotic cleaning device, and an angle-measuring device arranged to measure tilt angles of the robotic cleaning device. In the robotic cleaning device, the controller is arranged to control the angle-measuring device to measure a first tilt angle of the robotic cleaning device before the obstacle is traversed, and to measure a second tilt angle of the robotic cleaning device while the robotic cleaning device traverses the obstacle, the controller further being arranged to compare the second tilt angle with the first tilt angle, and to control the operation of the robotic cleaning device based on a difference between the second tilt angle and the first tilt angle.

By measuring the tilt angle of the robotic cleaning device using for instance an accelerometer and/or a gyroscope before and after an obstacle/object (the two terms are used interchangeably in the following) located on a surface to be cleaned is to be traversed, such as a thick rug, the operation of the robotic cleaning device can advantageously be controlled as will be discussed in the following with respect to various embodiments of the present invention. It can be envisaged that the tilt angles are measured with respect to a reference orientation such as a surface to be cleaned or to gravity.

In an embodiment of the present invention, the controlling of the cleaning device operation based on a difference between the second tilt angle and the first tilt angle comprises controlling the robotic cleaning device to perform a second cleaning program different from a first cleaning program performed before the object was traversed, when the difference between the second tilt angle and the first tilt angle exceeds a threshold value. Advantageously, when the robotic cleaning device moves over a plane surface, such as floor inside a house, the tilt angle is zero or very close to zero. As long as the robotic cleaning device moves over a plane, ordinary floor, the cleaning device may perform a first cleaning program. However, when an object is detected being e.g. a thick rug, the robotic cleaning device will climb the rug and perform at least a second measurement of the tilt angle as the rug is traversed. If the second tilt angle differs from the first tilt angle (i.e. the second angle is non-zero or greater than a predetermined threshold value), it can be deducted that the robotic cleaning device does not move across a plane surface. If further measurements of the tilt angle are performed, and the tilt angle is changing from one measurement to the other, it can be deducted that the robotic cleaning device moves across a soft and/or ragged rug, calling for a second, more intense cleaning program as compared to the first program performed when the robotic cleaning device moves over a plane surface. When the robotic cleaning device has traversed the rug and again moves across a plane floor, a further measurement of the tilt angle can be performed and compared with the first tilt angle when the cleaning device was cleaning the rug. Based on the comparison, the cleaning device switches to the first cleaning program, since the two angles are the same. Further, by relating the second tilt angle to the first tilt angle, a sloping surface is accounted for since such a sloping surface is taken into consideration when measuring the first tilt angle.

In an embodiment of the present invention, the robotic cleaning device is positioned with respect to detected obstacles, and movement of the robotic cleaning device is controlled performed on the basis of the positioning.

Advantageously, by positioning the robotic cleaning device with respect to the surface to be cleaned, i.e. position or coordinates of the robotic cleaning device in relation to the surface to be cleaned and obstacles located on or above the surface is derived, a 3D representation or map can be created over e.g. a living room in a house. The positioning of the robotic cleaning device, which e.g. is implemented by means of using a 3D camera system comprising a 3D camera device configured to record images of the vicinity of the robotic cleaning device and a controller being configured to generate a map over the area to be cleaned from the recorded images using for instance a methodology such as SLAM, enables the robotic cleaning device to attain a detailed view, in 3D, of the area to be cleaned. The robotic device detects obstacles located on the surface to be cleaned and further advantageous is that, by means of the detection of obstacles and the subsequent positioning, the robotic cleaning device is capable of navigating with higher precision, for example by means of navigating close to obstacles such as tables, chairs, walls, etc., without bumping into the obstacles.

In a further embodiment of the present invention, the controlling of the cleaning device operation based on a difference between the second tilt angle and the first tilt angle comprises inactivating the positioning of the robotic cleaning device before the object is traversed; and re-activating the positioning of the robotic cleaning device when the second tilt angle is substantially equal to the first tilt angle. When the robotic cleaning device moves over a plane surface, such as floor inside a house, the tilt angle of the cleaning device with respect to the surface across which it moves is zero or very close to zero. The positioning of the robotic cleaning device, which is implemented by means of using e.g. the above mentioned 3D camera system comprising a 3D camera device configured to record images of the vicinity of the robotic cleaning device and the controller being configured to generate a map over the area to be cleaned from the recorded images using for instance SLAM, is under such circumstances far more straightforward as compared to a scenario where the robotic cleaning device moves across a bumpy and irregular surface.

Now, when the robotic cleaning device climbs an obstacle such as e.g. a door step or a rug, positional data derived by the controller used to control the movement of the robotic cleaning device becomes hard to interpret as the tilt angle of the robotic cleaning device (at least temporarily) becomes steep when the cleaning device sways back and forth when climbing the obstacle. Since the robotic cleaning device takes the derived positional data into account when navigating around the surface to be cleaned, the navigation runs the risk of becoming defective in case the derived positional data is incorrect. In such a case, the present embodiment advantageously inactivates the positioning of the robotic cleaning device before the object is traversed. Thereafter, the robotic cleaning device traverses the object, measures the second tilt angle, and compares the second tilt angle to the first tilt angle. If the two tilt angles are substantially the same, the robotic cleaning device is considered to have successfully climbed the encountered object, and the positioning of the robotic cleaning device is re-activated. As a result, the positioning need not take into account inexact and noisy data caused by a tilting cleaning device on the basis of which navigation is performed, which greatly improves the performance of positioning algorithms executed by the controller.

In still another embodiment of the present invention, the measuring of the second tilt angle of the robotic cleaning device while the robotic cleaning device traverses the object further comprises measuring a number of (second) tilt angles while the robotic cleaning device traverses the object. One or more of these measured tilt angles are compared to the first tilt angle, and the operation of the robotic cleaning device is controlled based on a difference between the one or more of the number of tilt angles and the first tilt angle. It may be advantageous to base the control of the operation of the robotic cleaning device on more than one single measurement as the cleaning device traverses the object, particularly if the single measurement of the second tilt angle for some reason is inexact or even incorrect. Further advantageous is that it may be desirable to instantaneously detect the tilt angle of the robotic cleaning device as it transverses the object, for instance in case a particular cleaning program is selected as previously has been described.

In yet another embodiment of the present invention, the measuring of the second tilt angle of the robotic cleaning device while the robotic cleaning device traverses the object further comprises controlling the robotic cleaning device to traverse the object according to a predetermined movement pattern while measuring the second tilt angle(s). Advantageously, it may be desirable that the robotic cleaning device moves straight forward across the object to be traversed while measuring the second tilt angle(s) and/or that the speed with which the robotic cleaning device moves is lowered during the measuring of the second tilt angle(s).

It should be noted that the measuring of the first tilt angle not necessarily is undertaken when an object is detected, but could be undertaken even before the object is encountered, for instance when starting the robotic cleaning device and the cleaning device moves across a plane surface. Thus, the second tilt angle(s) measured are related to the measured first tilt angle, the first tilt angle measurement serving as a reference measurement.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which:

FIG. 3 shows a front view of the robotic cleaning device illustrated in FIG. 1a;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1A:
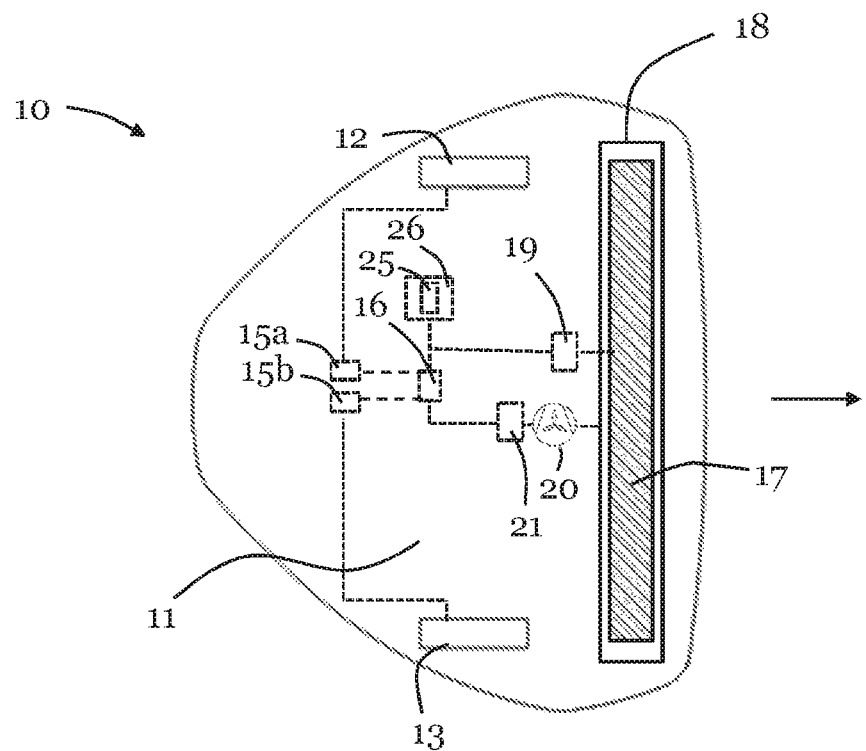
FIG. 1a is shows a bottom view of a robotic cleaning device according to embodiments of the present invention.

FIG. 1a is shows a robotic cleaning device 10 according to embodiments of the present invention in a bottom view, i.e. the bottom side of the robotic cleaning device is shown. The arrow indicates the forward direction of the robotic cleaning device. The robotic cleaning device 10 comprises a main body 11 housing components such as a propulsion system comprising driving means in the form of two electric wheel motors 15a, 15b for enabling movement of the driving wheels 12, 13 such that the cleaning device can be moved over a surface to be cleaned. Each wheel motor 15a, 15b is capable of controlling the respective driving wheel 12, 13 to rotate independently of each other in order to move the robotic cleaning device 10 across the surface to be cleaned. A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system.

A controller 16 such as a microprocessor controls the wheel motors 15a, 15b to rotate the driving wheels 12, 13 as required in view of information received from an obstacle detecting device (not shown in FIG. 1a) for detecting obstacles in the form of walls, floor lamps, table legs, around which the robotic cleaning device must navigate. The obstacle detecting device may be embodied in the form of infrared (IR) sensors and/or sonar sensors, a microwave radar, a 3D sensor system registering its surroundings, implemented by means of e.g. a 3D camera, a camera in combination with lasers, a laser scanner, etc. for detecting obstacles and communicating information about any detected obstacle to the microprocessor 16. The microprocessor 16 communicates with the wheel motors 15a, 15b to control movement of the wheels 12, 13 in accordance with information provided by the obstacle detecting device such that the robotic cleaning device 10 can move as desired across the surface to be cleaned. This will be described in more detail with reference to subsequent drawings.

Further, the main body 11 may optionally be arranged with a cleaning member 17 for removing debris and dust from the surface to be cleaned in the form of a rotatable brush roll arranged in an opening 18 at the bottom of the robotic cleaner 10. Thus, the rotatable brush roll 17 is arranged along a horizontal axis in the opening 18 to enhance the dust and debris collecting properties of the cleaning device 10. In order to rotate the brush roll 17, a brush roll motor 19 is operatively coupled to the brush roll to control its rotation in line with instructions received from the controller 16.

Moreover, the main body 11 of the robotic cleaner 10 comprises a suction fan 20 creating an air flow for transporting debris to a dust bag or cyclone arrangement (not shown) housed in the main body via the opening 18 in the bottom side of the main body 11. The suction fan 20 is driven by a fan motor 21 communicatively connected to the controller 16 from which the fan motor 21 receives instructions for controlling the suction fan 20. It should be noted that a robotic cleaning device having either one of the rotatable brush roll 17 and the suction fan 20 for transporting debris to the dust bag can be envisaged. A combination of the two will however enhance the debris-removing capabilities of the robotic cleaning device 10.

The main body 11 or the robotic cleaning device 10 is further equipped with an angle-measuring device 24, such as e.g. an accelerometer and/or a gyroscope or any other appropriate device for measuring orientation of the robotic cleaning device 10, arranged to measure a tilt angle of the robotic cleaning device 10 with respect to the a reference orientation defined e.g. by the surface to be cleaned or gravity such that the operation of the robotic cleaning device can be controlled on the basis of a measured tilt angle. The angle-measuring device 24 is in the following referred to as an accelerometer.

With further reference to FIG. 1a, the controller/processing unit 16 embodied in the form of one or more microprocessors is arranged to execute a computer program 25 downloaded to a suitable storage medium 26 associated with the microprocessor, such as a Random Access Memory (RAM), a Flash memory or a hard disk drive. The controller 16 is arranged to carry out a method according to embodiments of the present invention when the appropriate computer program 25 comprising computer-executable instructions is downloaded to the storage medium 26 and executed by the controller 16. The storage medium 26 may also be a computer program product comprising the computer program 25. Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 116 over a network. The controller 16 may alternatively be embodied in the form of a digital signal processor (DSP), an application specific integrated circuit (ASIC), a field-programmable gate array (FPGA), a complex programmable logic device (CPLD), etc.

Figure 1B:
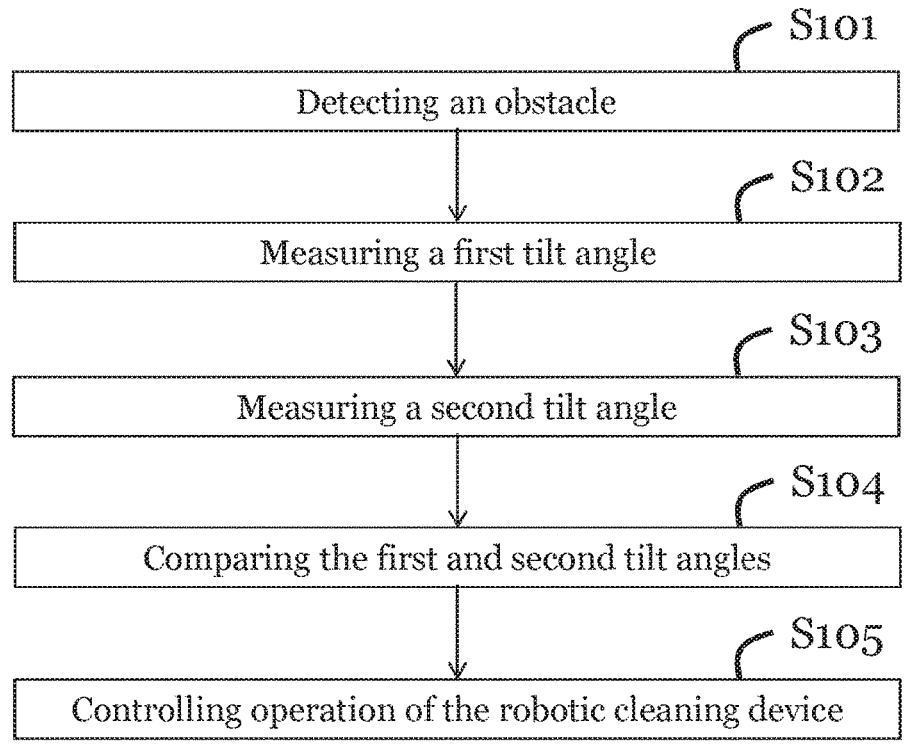
FIG. 1b illustrates a flow chart of a basic embodiment of a method of operating a robotic cleaning device according to the present invention.

FIG. 1b illustrates a flowchart of a method according to a basic embodiment of the present invention where a surface is to be cleaned. In a first step S101 the controller 16 of the robotic device 10 detects an obstacle to be traversed by means of employing any appropriate object detection device as previously discussed. In step S102, the controller 16 sends an instruction to the accelerometer 24 to measure a first tilt angle of the robotic cleaning device before the obstacle is traversed. As the obstacle is traversed by having the controller 16 sends signals accordingly to the wheel motors 15a, 15b to control rotation of the wheels 12, 13, the controller 16 instructs the accelerometer 24 to measure a second tilt angle of the robotic cleaning device in step S103, and compares the second tilt angle with the first tilt angle in step S104. In step S105, the controller 16 controls the operation of the robotic cleaning device 10 based on a difference between the second tilt angle and the first tilt angle.

A number of embodiments illustrating different obstacle-traversing situations will be described in detail in the following.

Figure 2A:
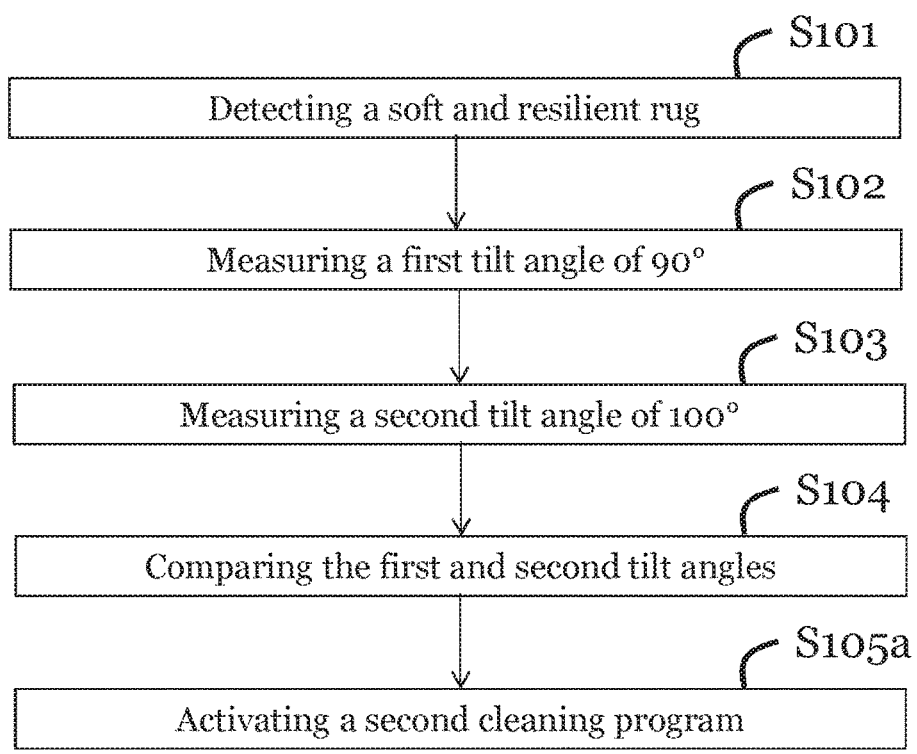
FIG. 2a illustrates a flow chart of an embodiment of a method of operating a robotic cleaning device according to the present invention.
Figure 2B:
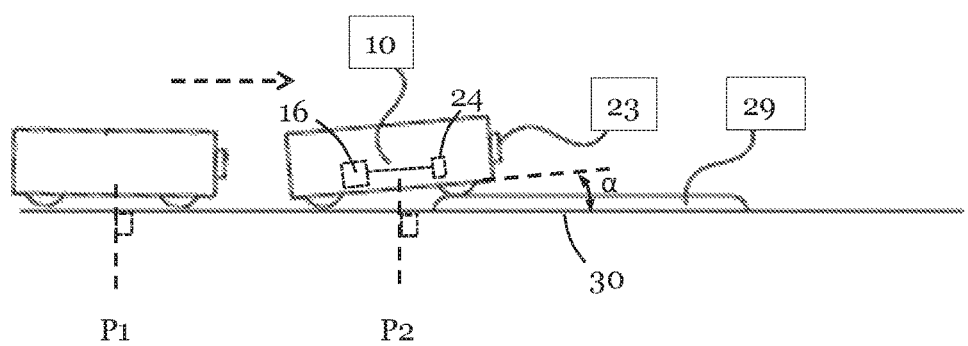
FIG. 2b illustrates a robotic cleaning device traversing an object according to an embodiment of the present invention.

FIG. 2a illustrates a flow chart of another embodiment of the method of controlling operation of a robotic cleaning device according to the present invention, where the object illustrated in FIG. 2b is to be traversed is a rug 29 located on a surface 30 to be cleaned. Hence, in step S101, the object detection device, being for instance a 3D camera system 23 detects the rug 29 to be traversed, and the controller 16 instructs the accelerometer 24 to measure a first tilt angle of the robotic cleaning device 10 in position P1 with respect to gravity in step S102. Since the device is located on a plane surface, the tilt angle with respect to gravity is 90°. As the robotic cleaning device 10 is controlled by the controller 16 to traverse the rug and move into position P2, the controller will frequently instruct the accelerometer 24 to measure the tilt angle of the robotic cleaning device 10 with respect to gravity, which will differ from 90° as long as the robotic cleaning device 10 climbs up the edge of the rug 29. Thus, in step S103, a tilt angle of 100° with respect to gravity is measured by the accelerometer 24 and reported to the controller 16 which in step S104 compares the two measured angles, and in case the difference exceeds a predetermined threshold value of, say, 5°, the controller 16 will conclude that the robotic cleaning device 10 moves over a soft and porous object. In this particular embodiment, the controller 16 responds to the difference in measured tilt angles by activating, in step S105a, a second cleaning program different from a first cleaning program performed before the rug 29 was traversed. As long as the tilt angle exceeds 5°, the controller 16 executes the second cleaning program which is more powerful and intense since a soft and thick rug is likely to require a more thorough cleaning than a plane surface. The second cleaning program is activated until the robotic cleaning device 10 leaves the rug 29 where the tilt angle of the robotic cleaning device 10 with respect to gravity will be equal to the measured first tilt angle since the robotic cleaning device 10 moves over the plane surface 30. Thus, the first tilt angle will act as a reference tilt angle to which the other measured tilt angles are compared.

Figure 3:
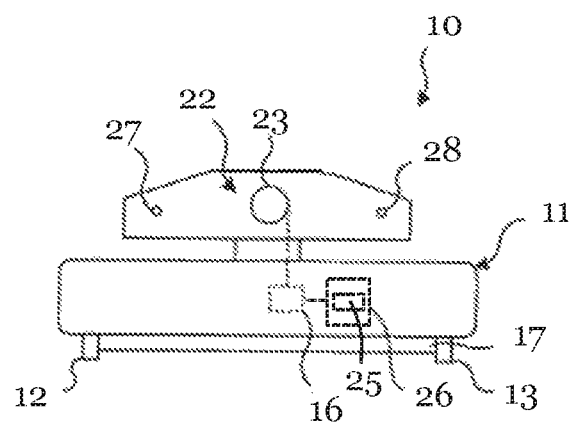

FIG. 3 shows a front view of the robotic cleaning device 10 of FIG. 1a in an embodiment of the present invention illustrating the previously mentioned obstacle detecting device in the form of a 3D camera system 22 comprising at least a camera 23 and a first and a second line laser 27, 28, which may be horizontally or vertically oriented line lasers. Further shown is the controller 16, the main body 11, the driving wheels 12, 13, and the rotatable brush roll 17 previously discussed with reference to FIG. 1a. The controller 16 is operatively coupled to the camera 23 for recording images of a vicinity of the robotic cleaning device 10. The first and second line lasers 27, 28 may preferably be vertical line lasers and are arranged lateral of the camera 23 and configured to illuminate a height and a width that is greater than the height and width of the robotic cleaning device 10. Further, the angle of the camera 23 is preferably smaller than the space illuminated by the first and second line lasers 27, 28. The camera 23 is controlled by the controller 16 to capture and record a plurality of images per second. Data from the images is extracted by the controller 16 and the data is typically saved in the memory 26 along with the computer program 25.

The first and second line laser 27, 28 are configured to scan, preferably in a vertical orientation, the vicinity of the robotic cleaning device 10, normally in the direction of movement of the robotic cleaning device 10. The first and second line lasers 27, 28 are configured to send out laser beams, which illuminate furniture, walls and other objects of a home or room. The camera 23 is controlled by the controller 16 to capture and record images from which the controller 16 creates a representation or layout of the surroundings that the robotic cleaning device 10 is operating in, by extracting features from the images and by measuring the distance covered by the robotic cleaning device 10, while the robotic cleaning device 10 is moving across the surface to be cleaned. Thus, the controller 16 derives positional data of the robotic cleaning device 10 with respect to the surface to be cleaned from the recorded images, generates a 3D representation of the surroundings from the derived positional data and controls the driving motors 15a, 15b to move the robotic cleaning device across the surface to be cleaned in accordance with the generated 3D representation and navigation information supplied to the robotic cleaning device 10 such that the surface to be cleaned can be navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the 3D camera system 22 thus facilitates detection of obstacles in the form of walls, floor lamps, table legs, around which the robotic cleaning device must navigate as well as rugs, carpets, doorsteps, etc., that the robotic cleaning device 10 must traverse. The robotic cleaning device 10 is hence configured to learn about its environment or surroundings by operating/cleaning.

With respect to FIG. 3, for illustrational purposes, the 3D camera system 22 is separated from the main body 11 of the robotic cleaning device 10. However, in a practical implementation, the 3D camera system 22 is likely to be integrated with the main body 11 of the robotic cleaning device 10 to minimize the height of the robotic cleaning device 10, thereby allowing it to pass under obstacles, such as e.g. a sofa.

Figure 4:
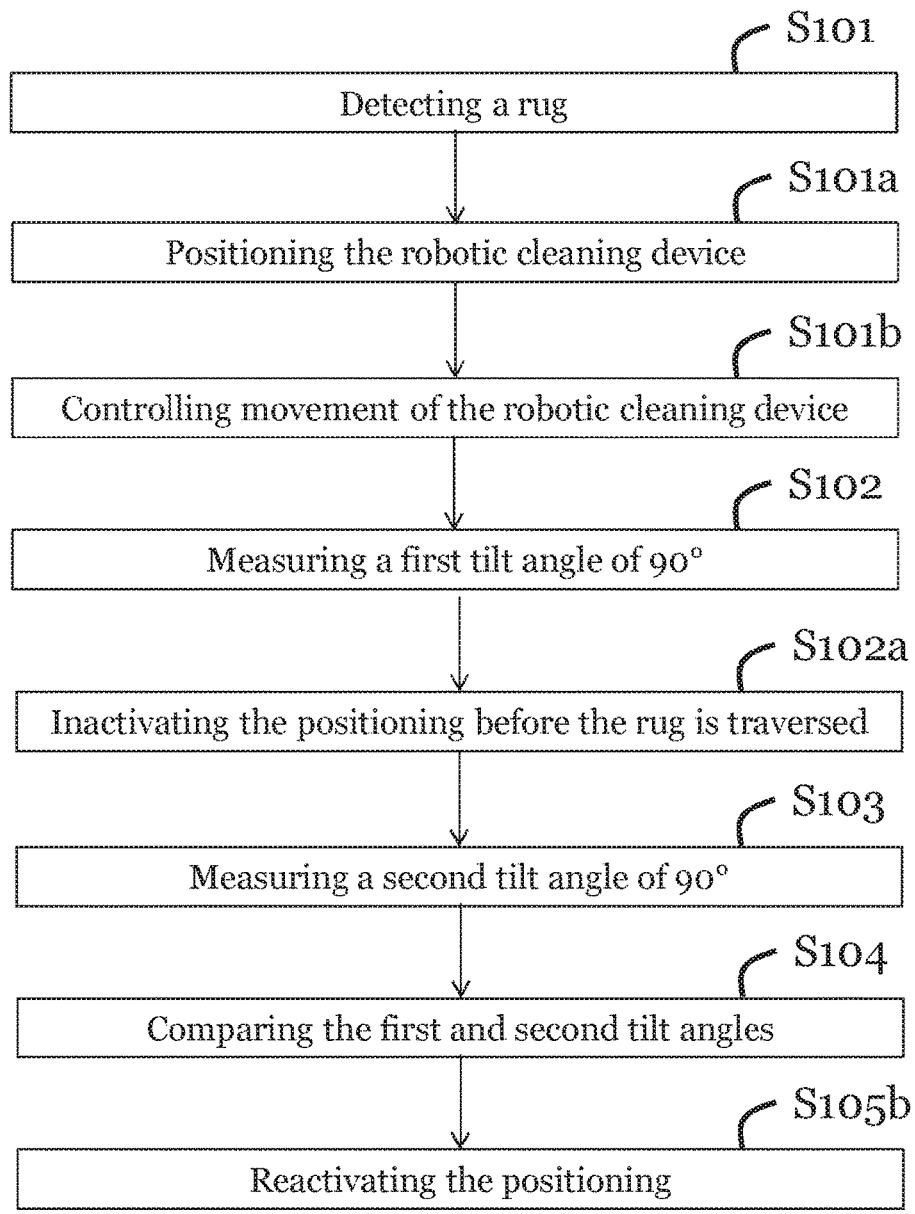
FIG. 4 illustrates a flow chart of another embodiment of a method of operating a robotic cleaning device according to the present invention.

FIG. 4 illustrates a flow chart of an embodiment of the method of controlling operation of a robotic cleaning device according to the present invention when obstacle detection and positioning using the 3D camera system 22 is taken into consideration. Reference is further made to FIGS. 1a and 3 for elements of the robotic cleaning device 10 of the present invention. In a first step S101, the 3D camera system 22 comprising the camera 23 and the first and second vertical line lasers 27, 28 is arranged to record images of a vicinity of the robotic cleaning from which obstacles may be detected. The controller 16 is capable of positioning the robotic cleaning device 10 in step S101a with respect to the detected obstacles and hence a surface to be cleaned by deriving positional data from the recorded images. From the positioning, the controller 16 controls movement of the robotic cleaning device 10 in step S101b by means of controlling the wheels 12, 13 via the wheel drive motors 15a, 15b, across the surface to be cleaned.

The derived positional data facilitates control of the movement of the robotic cleaning device 10 such that cleaning device can be navigated to move very close to an object, and to move closely around the object to remove debris from the surface on which the object is located. Hence, the derived positional data is utilized to move flush against the object, being e.g. a thick but non-springy rug. Typically, the controller 16 continuously generates and transfers control signals to the drive wheels 12, 13 via the drive motors 15a, 15b such that the robotic cleaning device 10 is navigated close to the object.

The controller 16 instructs in step S102 the accelerometer 24 to measure a tilt angle of the robotic cleaning device 10 with respect to gravity, which is 90° since the device is located on a plane surface. Now, before the rug is traversed, the controller 16 inactivates its positioning algorithms in step S102a. This is advantageously undertaken in order to avoid gathering positional data which are inexact and difficult to interpret as the robotic cleaning device 10 climbs the rug.

As the robotic cleaning device 10 is controlled by the controller 16 the traverse the rug, the controller will frequently instruct the accelerometer 24 to measure the tilt angle of the cleaning device with respect to gravity, which will differ from the reference measurement of 90° as long as the robotic cleaning device 10 climbs up the edge of the rug. As long as the tilt angle deviates from the first reference angle, the controller will keep the positioning algorithm inactivated. However, as the robotic cleaning device 10 has climbed the edge, the accelerometer will in step S103 report a tilt angle of 90° with respect to gravity, and the controller 16 compares the two measured tilt angles in step S104. Since the two angles are equal, the controller 16 will conclude that the positioning again can be activated, and thus activates the positioning algorithm in step S101b.

It should be noted that the previously described embodiment where a second cleaning program is activated in response to a difference between the first and second tilt angles can be combined with the positioning as desired.

Figure 5:
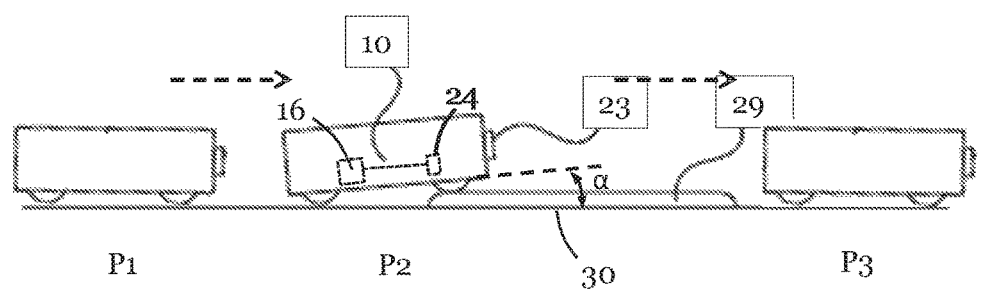
FIG. 5 illustrates a robotic cleaning device traversing an object according to a further embodiment of the present invention.

FIG. 5 illustrates a robotic cleaning device 10 traversing an object 29 in the form of a rug located on a surface 30 to be cleaned. As previously has been described, the robotic cleaning device 10 positions itself with respect to its surroundings by means of the 3D camera 23 and the controller 16, and moves across the surface 30 by taking into account positional data output from the positioning algorithm. The controller 16 thus detects the rug 29 to be traversed, which is located on the surface 30 to be cleaned by the robotic cleaning device 10.

In a first position P1, the accelerometer 24 measures the tilt angle of the robotic cleaning device 10, in this particular embodiment with respect to the surface 30 to be cleaned instead of gravity, before the rug 29 is traversed. Since the robotic cleaning device 10 moves over a plane surface 30, such as floor inside a house, the tilt angle is zero or very close to zero. This first tilt angle is used as a reference angle for subsequent measurements when the rug 29 is traversed by the cleaning device 10. When the robotic cleaning device 10 is controlled to move to a second position P2 where the rug 29 is traversed, a second tilt angle α is measured by the accelerometer 24, and the controller 16 compares the second tilt angle α with the measured first (reference) tilt angle. In this particular exemplifying embodiment, there is a clear difference between the two tilt angles, on the basis of which the operation of the robotic cleaning device 10 is controlled.

In an embodiment of the present invention, the controlling of the cleaning device operation based on the difference in tilt angles comprises controlling the robotic cleaning device 10 to perform a second cleaning program different from a first cleaning program performed before the rug 29 was traversed, as has been illustrated in the flowchart of FIG. 2a. Hence, as long as the robotic cleaning device 10 moves over the plane surface in position P1, it may only be required to perform a gentle cleaning program, where for instance the rotatable brush roll 17 is set to rotate with a low frequency and/or the speed of movement of the robotic cleaning device 10 is controlled to be relatively high. However, when the rug 29 is climbed in position P2, the difference between the second tilt angle α and the first zero-angle will cause the controller 16 to initiate a second cleaning program, possibly implying high-frequency rotation of the brush roll 17 and/or greater suction power of the suction fan 20 and/or a lower speed of movement of the robotic cleaning device 10. Typically, the (second) tilt angle of the robotic cleaning device 10 is continuously measured by the accelerometer 24 as the robotic cleaning device traverses the rug 29, and as the robotic cleaning device 10 at least slightly will wiggle back and forth as it cleans the rug 29, there will be a difference in measured tilt angles with respect to the first reference angle measured at position P1, and the second cleaning program will be maintained.

However, in an embodiment of the invention, as the robotic cleaning device 10 leaves the rug 29 in position P3, a third tilt angle of the robotic cleaning device with respect to the surface to be cleaned is measured by the accelerometer 24. The controller 16 compares the third tilt angle with the first tilt angle and concludes that they are identical. The control can thus change to the original first cleaning program.

Again with reference to FIG. 5, in another embodiment of the present, the operation of the robotic cleaning device 10 is controlled in an alternative manner, as has been illustrated in the flowchart of FIG. 4. In this exemplifying embodiment, the object 29 is not a soft and porous rug, but a non-springy carpet which the robotic cleaning device 10 traverses with a zero (or near-zero) tilt angle. Hence, in the first position P1, the accelerometer 24 measures the tilt angle of the robotic cleaning device 10 with respect to the surface 30 to be cleaned before the carpet 29 is traversed. Since the robotic cleaning device 10 moves over a plane surface 30, such as floor inside a house, the tilt angle is zero or very close to zero. This first tilt angle is used as a reference angle for subsequent measurements when the carpet 29 is traversed by the cleaning device 10. Before the robotic cleaning device 10 is controlled to move to a second position P2 where the carpet 29 is traversed, the positioning of the robotic cleaning device 10 is inactivated, for instance by having the controller 16 temporarily inactivating its positioning algorithms. As the robotic cleaning device 10 traverses the carpet 29, a second tilt angle α is measured by the accelerometer 24, and the controller 16 compares the second tilt angle α with the measured first (reference) tilt angle. In this particular exemplifying embodiment, there is initially a clear difference between the two tilt angles, and thus the controller 16 will keep the positioning inactivated. However, as the robotic cleaning device has climbed the carpet 29, the non-springy carpet will not cause the robotic cleaning device to tilt with respect to the surface 30. Hence, the tilt angles α is zero and the positioning of the robotic cleaning device 10 is re-activated. Thus, to avoid causing problems for the positioning algorithms executed by the controller 16, the algorithms are temporarily inactivated when the robotic cleaning device 10 is to transverse a bumpy and irregular section of the surface to be cleaned.

With reference again to FIG. 5, in a further embodiment of the present invention, as the robotic cleaning device 10 approaches position P3 and leaves the carpet 29, the edge of the carpet 29 will cause the robotic cleaning device to tilt. Thus, further (second) tilt angles are measured by the accelerometer 24 continuously as the carpet 29 is traversed, and in case there is a difference between any one of these further measured tilt angles and the first reference tilt angle of position P1, the positioning will be re-inactivated until position P3 has been reached, in which case the result of the positioning algorithms again can be trusted.

In still another embodiment of the present invention, as has been described with reference to FIG. 5, the measuring of the second tilt angle of the robotic cleaning device 10 by the accelerometer 24 with respect to the surface 30 to be cleaned while the robotic cleaning device 10 traverses the object 29 further comprises measuring a number of (second) tilt angles while the robotic cleaning device 10 traverses the object 29. One or more of these measured tilt angles are compared to the first tilt angle, and the operation of the robotic cleaning device 10 is controlled based on a difference between the one or more of the number of tilt angles and the first tilt angle. It may be advantageous to base the control of the operation of the robotic cleaning device 10 on more than one single measurement as the cleaning device 10 traverses the object 29 for various reasons, e.g. if the single measurement of the second tilt angle for some reason is inexact or even incorrect. Further advantageous is that it may be desirable to instantaneously detect the tilt angle of the robotic cleaning device 10 as it transverses the object 29, for instance in case a particular cleaning program is selected as previously has been described, in which case the (second) tilt angles must be measured repeatedly as the robotic cleaning device 10 transverses the object 29.

In yet another embodiment of the present invention, the measuring of the second tilt angle of the robotic cleaning device 10 by the accelerometer 24 with respect to the surface 30 to be cleaned, or with respect to gravity, while the robotic cleaning device 10 traverses the object 29 further comprises having the controller 16 control the robotic cleaning device 10 to traverse the object 29 according to a predetermined movement pattern while measuring the second tilt angle(s). Advantageously, it may be desirable that the robotic cleaning device 10 moves straight forward across the object 29 to be traversed while measuring the second tilt angle(s) and/or that the speed with which the robotic cleaning device 10 moves is lowered during the measuring of the second tilt angle(s). It should be noted that the measuring of the first tilt angle not necessarily is undertaken when an object is detected, but could be undertaken even before the object is encountered, for instance when starting the robotic cleaning device and the cleaning device moves across a plane surface. Thus, the second tilt angle(s) measured are related to the measured first tilt angle, the first tilt angle measurement serving as a reference measurement.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling operation of a robotic cleaning device, comprising the steps of:
    detecting an obstacle to be traversed;
    measuring a first tilt angle of the robotic cleaning device before the obstacle is traversed;
    measuring a second tilt angle of the robotic cleaning device while the robotic cleaning device traverses the obstacle;
    comparing the second tilt angle with the first tilt angle;
    controlling the operation of the robotic cleaning device based on a difference between the second tilt angle and the first tilt angle;
    positioning the robotic cleaning device with respect to the obstacle to be traversed; and
    controlling movement of the robotic cleaning device on the basis of the positioning,
    wherein the step of controlling the operation based on a difference between the second tilt angle and the first tilt angle comprises:
        deactivating the positioning of the robotic cleaning device before the obstacle is traversed; and
        re-activating the positioning of the robotic cleaning device when the second tilt angle is substantially equal to the first tilt angle.

2. The method of claim 1, wherein the first tilt angle and the second tilt angle are measured with respect to a surface to be cleaned.

3. The method of claim 1, wherein the first tilt angle and the second tilt angle are measured with respect to gravity.

4. The method of claim 1, wherein the step of controlling the operation based on a difference between the second tilt angle and the first tilt angle comprises:
    controlling the robotic cleaning device to perform a second cleaning program different from a first cleaning program performed before the obstacle was traversed, when the difference between the second tilt angle and the first tilt angle exceeds a threshold value.

5. The method of claim 1, wherein the step of measuring a second tilt angle of the robotic cleaning device while the robotic cleaning device traverses the obstacle further comprises:
    measuring a number of tilt angles while the robotic cleaning device traverses the obstacle; the step of comparing further comprising:
    comparing one or more of the number of tilt angles with the first tilt angle, wherein the operation of the robotic cleaning device is controlled based on a difference between the one or more of the number of tilt angles and the first tilt angle.

6. The method of claim 5, wherein in case any one the number of tilt angles measured while the robotic cleaning device traverses the obstacle differs from the first tilt angle after a re-activating of the positioning has been performed, the positioning is again deactivated.

7. The method of claim 1, wherein the step of measuring a second tilt angle of the robotic cleaning device while the robotic cleaning device traverses the obstacle further comprises:
    controlling the robotic cleaning device to traverse the obstacle according to a predetermined movement pattern while measuring the second tilt angle.

8. The method of claim 1, further comprising:
    measuring a third tilt angle of the robotic cleaning device with respect to the surface to be cleaned after the object has been traversed;
    comparing the third tilt angle with the first tilt angle; and
    controlling the operation of the robotic cleaning device based on a difference between the third tilt angle and the first tilt angle.

9. A robotic cleaning device comprising:
a main body;
a propulsion system arranged to move the robotic cleaning device;
an obstacle detection device;
a controller arranged to control the propulsion system to move the robotic cleaning device; and
an angle-measuring device arranged to measure tilt angles of the robotic cleaning device;
wherein the controller is arranged to control the angle-measuring device to measure a first tilt angle of the robotic cleaning device before a detected obstacle is traversed, and to measure a second tilt angle of the robotic cleaning device while the robotic cleaning device traverses the obstacle, the controller further being arranged to compare the second tilt angle with the first tilt angle, and to control the operation of the robotic cleaning device based on a difference between the second tilt angle and the first tilt angle, and
wherein the controller is further arranged to:
perform a positioning of the robotic cleaning device with respect to the obstacle to be traversed, and
control movement of the robotic cleaning device on the basis of the positioning,
deactivate the positioning of the robotic cleaning device before the obstacle is traversed, and
re-activate the positioning of the robotic cleaning device when the second tilt angle is substantially equal to the first tilt angle.

10. The robotic cleaning device of claim 9, the controller further being arranged to:
perform a positioning of the robotic cleaning device with respect to the detected obstacle from positional data derived from the obstacle detection device, wherein the controlling of the movement of the robotic cleaning device is performed on the basis of the positioning.

11. The robotic cleaning device of claim 10, wherein the obstacle detection device comprises a 3D sensor system.

12. The robotic cleaning device of claim 11, wherein the 3D sensor system comprises:
a camera device arranged to record images of a vicinity of the robotic cleaning device; and
a first vertical line laser and a second vertical line laser arranged to illuminate the vicinity of the robotic cleaning device;
the controller further being arranged to derive the positional data from the recorded images.

13. The robotic cleaning device of claim 9, wherein the angle-measuring device comprises an accelerometer or a gyroscope.

14. The robotic cleaning device of claim 9, the controller further being arranged to:
when the difference between the second tilt angle and the first tilt angle exceeds a threshold value:
control the robotic cleaning device to perform a second cleaning program different from a first cleaning program performed before the obstacle was traversed.

15. The robotic cleaning device of claim 9, the controller further being arranged to:
measure a number of tilt angles while the robotic cleaning device traverses the obstacle; and
compare one or more of the number of tilt angles with the first tilt angle, wherein the operation of the robotic cleaning device is controlled based on a difference between the one or more of the number of tilt angles and the first tilt angle.

16. The robotic cleaning device of claim 15, the controller further being arranged to deactivate the positioning, when any one of the number of tilt angles measured while the robotic cleaning device traverses the obstacle differs from the first tilt angle after a re-activating of the positioning has been performed.

17. The robotic cleaning device of claim 9, the controller further being arranged to:
control the robotic cleaning device to traverse the obstacle according to a predetermined movement pattern while measuring the second tilt angle.

18. The robotic cleaning device of claim 9, the controller further being arranged to:
measure a third tilt angle of the robotic cleaning device after the obstacle has been traversed;
compare the third tilt angle with the first tilt angle; and
control operation of the robotic cleaning device based on a difference between the third tilt angle and the first tilt angle.

19. A computer program comprising computer-executable instructions for causing a device to perform the steps recited in claim 1 when the computer-executable instructions are executed on a processing unit included in the device.

20. A computer program product comprising a computer readable medium, the computer readable medium having the computer program according to claim 19 embodied therein.

* * * * *